United States Patent Office 2,894,843
Patented July 14, 1959

2,894,843

PRESERVATION OF COMESTIBLES WITH SUSPENSIONS

George J. Malecki, Le Sueur, Minn.

No Drawing. Application September 13, 1956
Serial No. 609,548

19 Claims. (Cl. 99—166)

This invention relates to the treatment of food products for the purpose of preservation and the prevention of discoloration. It is adapted to the treatment of fresh vegetables and fruit having exposed cut surfaces (e.g. peeled fresh fruits and vegetables and the butt ends of such vegetables as lettuce, cauliflower and romaine) frozen or dehydrated fruits and vegetables, fresh seafoods (such as fish, shrimp, oysters, lobsters, etc.) and fresh plant products subject to enzymatic activity (e.g. peas mechanically injured by vining, and sugar cane injured by cutting or crushing). In general the invention provides for the prevention or curtailment of deteriorative processes which cause discoloration, deterioration, putrefaction and other undesirable changes in food products.

In general the invention consists in applying to the food product a suspension of a slightly water-soluble non-toxic ingestible reducing agent. In such a medium the concentration of reducing agent is maintained at a desirably low level which has no substantial deleterious effect on the food, while the total amount (part being in solid suspended form) is sufficiently high to be effective in preventing undesirable changes. Any slightly soluble reducing agent which is non-toxic and is otherwise fit for human ingestion and which has a solubility in water of less than 5%, and preferably less than 1%, by weight, may be used. Reducing agents of this type are well known in the food processing industry, examples being calcium sulfite, calcium phosphite, magnesium sulfite, magnesium phosphite, iron sulfite, iron phosphite, aluminum sulfite, aluminum phosphite, calcium tartrate, iron ascorbate, aluminum ascorbate, and fatty acid esters of organic reducing acids such as the palmitate, oleate, laureate, stearate, myristibate, ricinoleate, arachindonate, linoleate, linolenate, palmitoleate, butyrate, caproate, caprylate, and caprate of ascorbic acid, and the corresponding fatty acid esters of glucose ascorbic acid and isoascorbic acid.

The invention may be embodied in a great variety of food treating processes where advantageous use may be made of the preservation and non-discoloration effects of the treatment, a representation few of which are described herein. For instance, in the peeling of fruits and vegetables by processes exposing the flesh to damaging causes, a suspension of the reducing agent may be applied to the food during or after the peeling operations to prevent the deleterious effects of such causes. Similarly slicing, washing and blanching operations may be carried out with the food in contact with a suspension of the reducing agent. In the storage of food products the suspension may be maintained in contact with the food to prevent deterioration and discoloration, and packaged foods may likewise be protected by an application of the reducing agent in accordance with this invention.

The manner of applying the suspension also lends itself to considerable variation and modification. The suspension may be an aqueous one, in which the slightly soluble reducing agent is present partly in solution and partly in undissolved suspended solid particles. However in many applications other dispersion mediums are also well suited. Frequently it is desired to coat the food product with a water repellent coating medium such as a wax, fat, or oil, in which case the reducing agent may be suspended in the water repellent medium. In other cases it is advantageous to use a dispersion or solution of a gel forming or thickening agent as the dispersion medium, and the reducing agent may in such cases be suspended therein. A further modification consists in forming the reducing agent as a suspension in situ in the food product itself, as by treating the food product first with one and then with the other of solutions of reagents reactive to form the reducing agent, as by metathesis. Where the food product to be treated is also to be iced, as in the case of lettuce, the invention is conveniently practiced by using ice formed with the reducing agent suspended in it, as by freezing an aqueous suspension of the reducing agents.

The foregoing methods and embodiments are presented as illustrative of the numerous modifications in which the invention may be practiced but are not to be construed as limiting the invention to them alone since other modifications will readily occur to those skilled in the art.

The following examples describe in detail various representative processes employing this invention in typical food processing operations.

The manufacture of pre-peeled potatoes involves the peeling of potatoes basically followed by the cutting and packaging of them. According to the present invention these operations are carried out with the flesh of the potatoes in contact with a suspension of a reducing agent.

In a typical operation the potatoes are abrasively peeled by any of numerous well known methods, such as by means of cylinder type batch peelers or continuous type roll feeders, or by subjecting the potatoes to the numerous impacts of a blast of abrasive particles. According to the present invention peeling may be carried out with the potatoes in contact with a suspension of the reducing agent. In the preferred method an abrsive peeler of the cylinder or roller type is sealed within a liquid-tight container which is then supplied with an aqueous suspension of the reducing agent, such as calcium sulphite, at 0.1% concentration. The amount of suspension present is preferably enough to cover the potatoes, in which case the buoyancy of the potatoes helps to minimize the bruising of them within the peeler. Alternately, however, the aqueous suspension may be sprayed on the potatoes during the peeling process.

Where the potatoes are irregularly shaped and contain indentations, peeling by the impact of a blast of abrasive particles is preferred because of the ability of such a method to act on the entire surface of the potatoes. According to the present invention the potatoes are contacted with the aqueous suspension during the peeling process, as by floating them in the suspension, by spraying them with the suspension simultaneously with the application of the blast of abrasive particles, or by applying the abrasive by suspending it in a stream of the suspension of reducing agent directed against the potato surfaces.

Following the peeling of the potatoes they are further processed, as by trimming off areas imperfectly peeled, then slicing and/or blanching preliminary to packing, frying, freezing, dehydrating, or canning, all according to conventional practice. In these operations the potatoes are often subjected to mechanical impacts and abrasions which tend to cause discoloration and to hasten deterioration. This is particularly true of potatoes which have been carefully processed during the peeling operations so as to have a surface consisting largely of living vegetable cells, such being particularly susceptible to the deleterious effects of such mechanical injury.

The effect of such injury is however greatly minimized by the application of a suspension of a reducing agent to the potatoes during the processing following peeling. This is conveniently done by spraying or flowing the suspension on or over the potatoes during these operations, or by keeping the potatoes submerged in the suspension.

Similarly the washing operations to which the potatoes are subjected during processing, for the purpose for instance of removing clinging potato particles or foreign matter, are advantageously done with an aqueous suspension of the reducing agent.

Where the potatoes are packaged for sale as prepeeled potatoes they are advantageously contacted with the suspension of reducing agent, such as a 0.05 to 1% suspension of calcium sulfite in water, for a short period of time prior to packaging, conveniently after or during the peeling operations as described above. In this treatment, the potatoes may be immersed in the suspension typically for between 15 seconds and 30 minutes. The time of immersion appears to have a slight effect on the length of time the potatoes may be stored without discoloration, but the effect is a minor one. An overly long immersion should however be avoided since the consequential exclusion of oxygen appears to destroy living cells. Generally speaking the time of immersion should not be longer than 30–45 minutes. In any case the ultimate time and temperature conditions are best determined experimentally because of the great individual variations arising from such factors as sugar content, age, variety, prior storage conditions and the like.

By applying a suspension of a reducing agent to the potatoes, they may be stored at room temperature for up to from 6 to 36 hours without discoloring, in contrast with only about 2–3 hours in which untreated peeled potatoes may be stored without discoloring. They are typically packed in bags and refrigerated at 33–40° F. for 24 to 48 hours and under these conditions they may be stored for up to 3 days without discoloring and for a much longer time without decaying or putrifying. On such longer storage the potatoes may yellow but this is without deleterious effect. The tendency to yellow appears to depend on the reducing sugar content and may be lessened by warming the potatoes to a temperature above about 60° F.

An alternative means of applying this invention to the preparation of pre-peeled potatoes consists in applying the reducing agent to the peeled potato surface as a suspension in a water repellent coating medium such as an oil, fat, wax or grease. Materials suitable as dispersion media are petrolatum jelly, paraffin wax, tallow, beeswax, carnauba wax, mineral oil, paraffin oil, cottonseed oil, edible oils and edible fats, to name but a few more common media of this type. When the water repellent material is liquid or semi-solid it is preferable that the potatoes present a smooth surface to assure that the coating be uniform, but where a solidified water repellent material is applied the surface may be rough.

The suspension of reducing agent in a water repellent organophilic medium may be applied in liquid (e.g. molten) form as a coating on the potato surface, as by dipping, spraying, or flowing the suspension over the potatoes, preferably at a temperature which is non-injurious to the living potato cells. The preferred method of applying the coating is by spraying, which may be successfully carried out even with normally solid materials such as paraffin wax, by spraying the wax in molten condition. Since solidification of the wax particles is not instantaneous an impervious coating of coalesced particles may readily be formed.

The amount of coating material of this type required is quite low particularly since an overly thick coating effective to prevent the access of oxygen to the potatoes should be avoided so as not to cause suffocation of the potato cells. In actual tests Katahdin potatoes of strip stock size (2½ inch dia. av.) required only 0.5 gram of petrolatum jelly per pound of potatoes. A coating of this type, containing the reducing agent suspended in it, is effective to extend the shelf life of peeled potatoes to 4–5 days. It moreover provides a covering which makes it possible to dispense with bags or other containers, and which is easily removed either before cooking or during cooking when it melts and floats away.

Another very satisfactory way of carrying out the invention consists in suspending the reducing agent in a hydrophilic colloid, such as an aqueous dispersion of a hydrophilic non-toxic polymer. Examples are methyl cellulose, carboxymethylcellulose, water soluble ethylcellulose, polyvinyl alcohol, agar, carrageen, pectin, algin or alginates, Iceland moss, gum karaya, starch, zein, gluten gelatin, gum tragacanth, gum arabic, gum Senegal, gum karaya, gum guar, locust bean gum and the like. A dispersion of one or more of these high molecular weight materials in water at a viscosity of 300–3000 cps. (depending on the desired thickness of coating) and containing the reducing agent suspended therein may be very satisfactorily applied to peeled potato surfaces as a liquid by spraying, dipping or flowing the liquid over the potatoes. A gel coating is preferably formed having a thickness between ½ and 4 mm. and is effective to extend the shelf life of potatoes to up to 4–7 days, depending on the thickness of the gel and other factors relating to the rate of deterioration of the potatoes. Since frequently a coating of this type may be sticky or otherwise unattractive it may be desirable to apply a further coating of a waxy substance, e.g. paraffin or beeswax. Coating of this type are easily removed either before cooking or during cooking when the gel melts and disperses in the cooking water. If an auxiliary outer waxy coating is also present it may also be removed in the same manner.

A very suitable gel coating medium can be prepared by dispersing in water 3% by weight of agar, 1% of carboxymethylcellulose (e.g. Hercules 70D high viscosity), and 1% of powdered calcium sulfite, the latter being suspended in the dispersion.

Although the foregoing processes have been described with specific reference to pre-peeled potatoes, they are equally applicable to either fruits and vegetables such as diced carrots, beets, apple slices, peach slices, and pear slices.

In the processing of peas after collection from the vines and prior to canning or freezing, there is often an extended storage period during which off-flavors may develop, particularly if the peas have been bruised in collection such that enzymatic actions occur. It has been found, however, that the application of a suspension of a reducing agent to the peas, in accordance with this invention, will greatly reduce deterioration of this type. The suspension of the reducing agent may be formed in an aqueous dispersion of a thickening agent having a high viscosity so that an adherent coating of substantial thickness is formed. Sometimes, however, a low viscosity suspension, as one prepared in water alone, is desired so that the suspension may easily be flowed over the peas.

Reducing agents particularly well suited for application to peas are calcium hydrogen phosphite and aluminum ascorbate. Sulfites are preferably avoided, as they tend to impart odd flavors to the peas.

A modification of the invention well suited to the processing of both frozen and dehydrated foods such as apples, peaches, apricots, raisins, pears, strawberries, prunes, potatoes and carrots, consists in forming the dispersed particles of reducing agent in situ within the flesh of the food. This may be done by treating the food with reagents reactive to form the reducing agent. In a typical embodiment the food is first soaked in a solution of a soluble sulfite, or sulfur dioxide, and is then soaked in a solution of a soluble calcium salt so that the slightly soluble calcium sulfite is formed within the food.

By way of example, apple slices may be first soaked in an aqueous solution containing 0.2–0.3% by weight of sulfur dioxide for about one minute, and then immersed in an aqueous solution of a calcium compound such as the hydroxide, sucrate, glutamate, chloride, ascorbate, gluconate, lactate, tartrate, citrate, malonate, maleate, malate, hypophosphite, etc. The calcium ions and sulfite ions react within the food tissue to form a suspension there. The suspension of calcium sulfite is generally of such low solubility as to be tasteless, although in acidic fruits a buffer to maintain the pH at above 5 is helpful to keep the calcium sulfite from dissolving. For instance, excess $Ca(OH)_2$ may be used as the calcium compound, or the sodium salt of the fruit acid (e.g. sodium citrate in the case of citrus fruits) may be added to raise the pH.

Instead of an initial treatment with sulfur dioxide, a solution of a sulfite salt, e.g. sodium sulfite, may be used as the sulfite solution, although a longer soaking is generally required to bring about the desired sulfite concentration within the food. Whereas a one minute soak of apples in a solution of $SO_2$ is effective, a sodium sulfite solution of equivalent sulfite concentration may require a soaking for as long as eight hours.

The formation of calcium sulfite in situ in this manner is particularly advantageous as a substitute for the conventional treatment of foods with sulfur dioxide prior to dehydration in that it does not impart a sulfite taste to the food.

A still further modification of the invention as applied to the treatment of fruits and vegetables preliminary to freezing or drying utilizes a dilute suspension of a reducing agent such as calcium sulfite to bleach acidic foods. In this case the low pH of the fruit is utilized to cause the sulfite to dissolve so as to be effective to bleach the food. By maintaining a very low total calcium sulfite concentration, e.g. 0.1–0.2%, the sulfite taste is avoided, yet the bleaching action is adequate. In this type of treatment it is often advantageous to lower the pH of the suspension to about 3.5–5.5 to reduce the soaking time necessary to dissolve the desired amount of calcium sulfite. For this purpose such non-toxic edible acids as acetic, tartaric, citric, or malic are useful.

The invention may be applied to the transportation and storage of such foods as lettuce, cauliflower and romaine, which tend to discolor rapidly at their butt ends, by icing with ice formed from a suspension of a slightly soluble reducing agent. Because of the very slight solubility of the reducing agents useful in this invention, such an ice may easily be formed without substantial fractional crystallization, and on melting the butt ends are continuously flowed over with a suspension of reducing agent.

Another treatment within the scope of this invention helpful in preserving the butt ends, consists in covering them with a gel containing dispersed particle of the slightly soluble reducing agent, such as the gels described above.

This invention in somewhat modified form is also useful in the processing and preservation of sea foods. The seafoods when caught and cleaned may be treated with a suspension of reducing agent in a gel forming medium, as described generally above, or with a suspension of a reducing agent in the form of ice. In either case it is preferred to include along with the reducing agent a preservative or bactericidal agent in an effective amount either in suspension or solution. Such agents include aluminum benzoate, aluminum penicillate, paraformaldehyde, all of which are of only slight solubility, and soluble compounds such as zinc salts, calcium benzoate, calcium penicillate, iron benzoate, antibiotics (e.g. terramycin, aureomycin, subtilin, streptomycin) and sulfa drugs (e.g. sulfathiazol, sulfapyradine, sulfadiazine). The combination of reducing agent and preservative is particularly advantageous in the storage of fish in preventing rancidity, putrification and other deteriorative changes.

This application is a continuation-in-part of my co-pending application Serial No. 398,409, which in turn is a continuation-in-part of my now abandoned application Serial No. 196,930, filed November 21, 1950.

I claim as my invention:

1. The method of treating food products from the group consisting of vegetables, fruits and sea foods subject to deteriorative processes comprising contacting the food product with a suspension of a non-toxic ingestible reducing agent having a solubility in water of less than 5 percent by weight.

2. The method of treating food products from the group consisting of vegetables, fruits and sea foods subject to deteriorative processes comprising contacting the food product with an aqueous medium having suspended therein a non-toxic ingestible reducing agent having a solubility in water of less than 5 percent by weight.

3. The method of treating food products from the group consisting of vegetables, fruits and sea foods subject to deteriorative processes comprising contacting the food product with a water repellent coating medium having suspended therein a non-toxic ingestible reducing agent having a solubility in water of less than 5 percent by weight.

4. The method of treating food products from the group consisting of vegetables, fruits and sea foods subjects to deteriorative processes comprising contacting the food product with ice comprising a frozen aqueous medium having suspended therein a non-toxic ingestible reducing agent having a solubility in water of less than five percent by weight.

5. The method of treating food products from the group consisting of vegetables, fruits and sea foods subject to deteriorative processes comprising contacting the food product with an aqueous dispersion of a high molecular weight hydrophilic colloid having suspended therein a non-toxic ingestible reducing agent having a solubility in water of less than 5 percent by weight.

6. The method of treating food products from the group consisting of vegetables, fruits and sea foods subject to deteriorative processes comprising contacting the food product with a first solution and then with a second solution, said solutions being reactive when mixed to form a suspension of a non-toxic ingestible reducing agent having a solubility in water of less than 1 percent by weight.

7. The method defined by claim 1 wherein the reducing agent is selected from the group consisting of calcium sulfite, magnesium sulfite and calcium tartrate.

8. The method defined by claim 1 wherein the reducing agent is calcium sulfite.

9. The method defined by claim 1 wherein the reducing agent is magnesium sulfite.

10. The method defined by claim 1 wherein the reducing agent is calcium tartrate.

11. The method defined by claim 2 wherein the reducing agent is calcium sulfite.

12. The method defined by claim 2 wherein the reducing agent is magnesium sulfite.

13. The method defined by claim 3 wherein the water repellent coating medium is a suspension of calcium sulfite in a hydrophobe sustance selected from the group consisting of paraffin oil, petrolatum jelly, paraffin wax, carnauba wax, cottonseed oil, tallow, beeswax, mineral oil, edible oils and edible fats.

14. The method defined by claim 3 wherein the water repellent coating medium is a suspension of material selected from the group consisting of calcium sulfite, magnesium sulfite, and calcium tartrate suspended in a hydrophobe substance from the class consisting of paraffin oil, petrolatum jelly, paraffin wax, carnauba wax, cottonseed oil, tallow, beeswax, mineral oil, edible oils and edible fats.

15. The method defined by claim 14 wherein the food product is a leafy vegetable having freshly cut butts and the reducing agent is calcium sulfite.

16. The method defined by claim 14 wherein the food product is a leafy vegetable having freshly cut butts and the reducing agent is magnesium sulfite.

17. The method defined by claim 4 wherein the food product is a leafy vegetable having freshly cut butts and the reducing agent is calcium tartrate.

18. The method defined by claim 1 in which the food product is one having an exposed cut surface and the suspension is brought into contact with said surface at the time it is cut.

19. The method defined by claim 18 wherein the suspension is brought into contact with the exposed cut surface while the food product is being peeled.

References Cited in the file of this patent

UNITED STATES PATENTS

| | | |
|---|---|---|
| 2,178,675 | Thomas | Nov. 7, 1939 |
| 2,298,933 | Elion | Oct. 13, 1942 |
| 2,322,493 | Wilson | June 22, 1943 |
| 2,336,291 | Phillips | Dec. 7, 1943 |
| 2,532,489 | Ferguson | Dec. 5, 1950 |
| 2,536,176 | Harris | Jan. 2, 1951 |
| 2,558,042 | Cornwall | June 26, 1951 |
| 2,567,085 | Stoloff | Sept. 4, 1951 |
| 2,626,646 | Treat | Jan. 27, 1953 |

UNITED STATES PATENT OFFICE
CERTIFICATE OF CORRECTION

Patent No. 2,894,843                                July 14, 1959

George J. Malecki

It is hereby certified that error appears in the printed specification of the above numbered patent requiring correction and that the said Letters Patent should read as corrected below.

Column 4, line 27, for "Coating" read -- Coatings --; column 5, line 68, for "sulfapyradine" read -- sulfapyridine --; column 6, line 59, for "sustance" read -- substance --; lines 72 and 75, for the claim reference numeral "14", in each occurrence, read -- 4 --.

Signed and sealed this 16th day of February 1960.

(SEAL)
Attest:

KARL H. AXLINE                                  ROBERT C. WATSON
Attesting Officer                                Commissioner of Patents